United States Patent
Guzik

(10) Patent No.: US 11,271,810 B1
(45) Date of Patent: Mar. 8, 2022

(54) HETEROGENEOUS CROSS-CLOUD SERVICE INTEROPERABILITY

(71) Applicants: Getac Technology Corporation, Taipei (TW); WHP Workflow Solutions, Inc., North Charleston, SC (US)

(72) Inventor: Thomas Guzik, Edina, MN (US)

(73) Assignees: Getac Technology Corporation, Taipei (TW); WHP Workflow Solutions, Inc., North Charleston, SC (US)

(*) Notice: Subject to any disclaimer, the term of this patent is extended or adjusted under 35 U.S.C. 154(b) by 0 days.

(21) Appl. No.: 17/107,891

(22) Filed: Nov. 30, 2020

(51) Int. Cl.
| H04L 12/24 | (2006.01) |
| H04L 29/08 | (2006.01) |
| H04L 41/082 | (2022.01) |
| H04L 67/56 | (2022.01) |

(52) U.S. Cl.
CPC ............ H04L 41/082 (2013.01); H04L 67/28 (2013.01)

(58) Field of Classification Search
CPC .............................. H04L 41/082; H04L 67/28
See application file for complete search history.

(56) References Cited

U.S. PATENT DOCUMENTS

| 7,917,888 | B2 | 3/2011 | Chong et al. |
| 8,606,844 | B2 | 12/2013 | Kaufman et al. |
| 9,264,678 | B2 | 2/2016 | Nuyttens et al. |
| 9,755,890 | B2 | 9/2017 | Robertson et al. |
| 9,832,205 | B2 | 11/2017 | Santhi et al. |
| 9,852,132 | B2 | 12/2017 | Chhichhia et al. |
| 9,886,261 | B1* | 2/2018 | Hotchkies ................ G06F 8/65 |
| 10,324,773 | B2 | 6/2019 | Wing et al. |
| 10,460,014 | B2 | 10/2019 | Lloyd et al. |
| 2003/0208679 | A1 | 11/2003 | Vazquez |
| 2006/0257001 | A1 | 11/2006 | Veen et al. |
| 2009/0210455 | A1* | 8/2009 | Sarkar ................ G06F 11/2038 |
| 2016/0190859 | A1 | 6/2016 | Blum et al. |
| 2018/0145923 | A1* | 5/2018 | Chen ..................... G06F 9/5077 |
| 2019/0026665 | A1 | 1/2019 | Caskey et al. |
| 2020/0304854 | A1 | 9/2020 | Baumgartner et al. |
| 2020/0351381 | A1* | 11/2020 | Lacey ................. G06F 9/45558 |
| 2021/0089374 | A1* | 3/2021 | Watson .................... G06F 9/542 |

OTHER PUBLICATIONS

U.S. Appl. No. 17/107,877, Office Action dated Aug. 18, 2021, 40 pages.

* cited by examiner

*Primary Examiner* — Gil H. Lee
(74) *Attorney, Agent, or Firm* — Han Santos, PLLC

(57) ABSTRACT

This disclosure describes techniques for improving CSB platforms (or CSB applications) that manages cloud services for different clients and different environments. In one example, the CSB platforms may be interconnected and configured to act as a proxy for the cloud services. The interconnected CSB platforms may perform spontaneous updating of stored service instance addresses when a service instance is tracked to trigger a strong consistency in the interconnected CSB platforms. Alternatively, the interconnected CSB platforms may perform delayed updating of stored service instance addresses when a service instance is tracked to trigger a weak consistency in the interconnected CSB platforms. Regulation of a frequency and scope of updating may improve the use of power resources in the CSB platforms.

20 Claims, 5 Drawing Sheets

HETEROGENEOUS CROSS-CLOUD SERVICE INTEROPERABILITY

BACKGROUND

Cloud software applications (or "applications") may usually utilize services that are exposed by an environment that they are running in, although the services themselves may be running outside of the environment. The services may range from low-level services such as a file system to high-level domain-specific business services. Management, monitoring, and maintenance of services are not the responsibility of the application of a service provider.

The cloud software applications are rapidly being adopted by business and information technology (IT) users as a way to make their organizations more effective and to save costs. Along with this opportunity comes some significant risk that needs to be addressed. For example, numerous challenges and limitations concerning implementing and managing cloud services that arise from a traditional cloud management model may need to be addressed.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Figure 1:
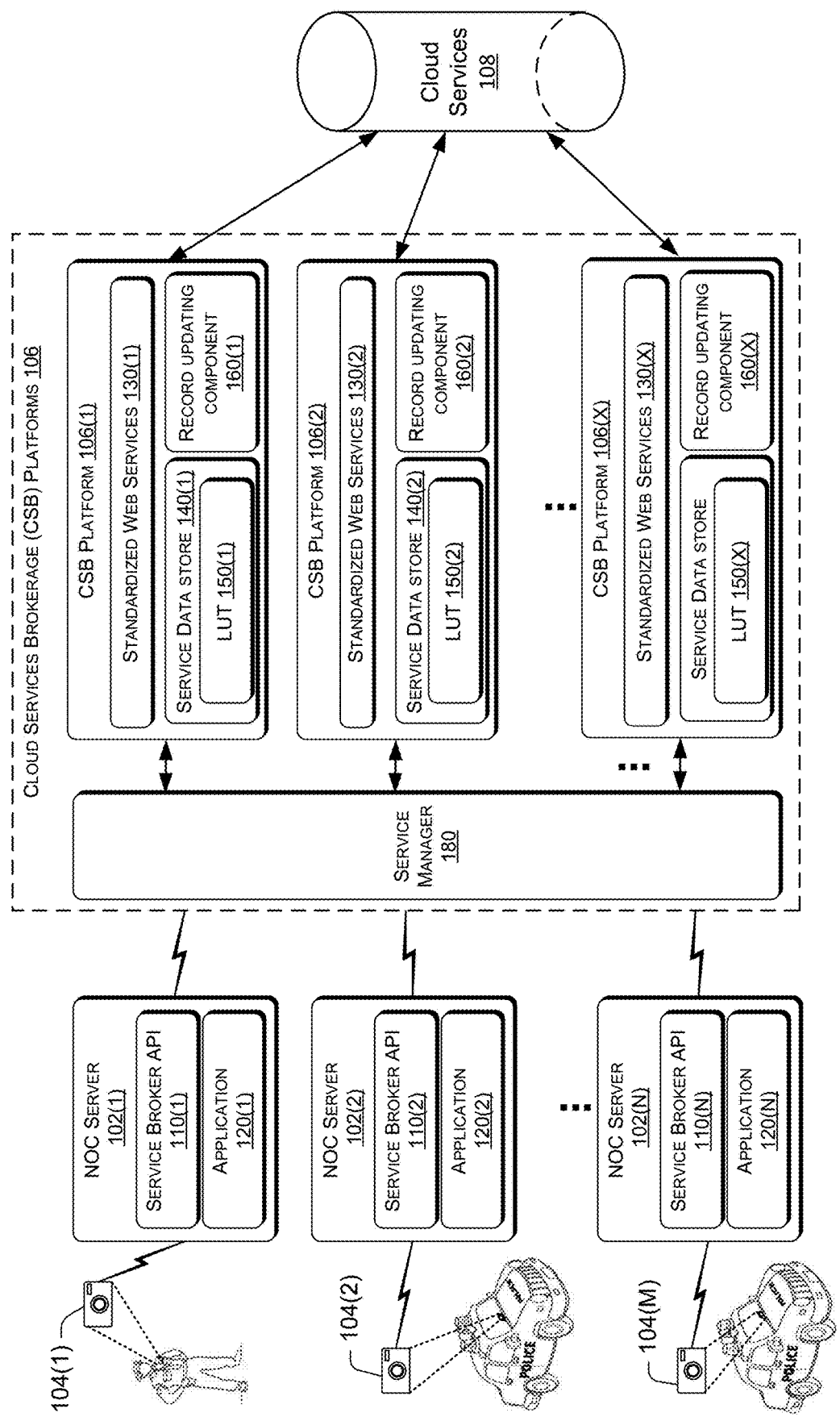
FIG. 1 illustrates a schematic view of an example cloud management model that utilizes a plurality of cloud services brokerage (CSB) platforms to manage cloud services for different clients and different environments.

This disclosure is directed to techniques for improving cloud services brokerage (CSB) platforms that provide cloud service consumers with a simple and comprehensive means for ordering cloud services. A CSB platform may provide to the cloud service consumers control and management of their cloud services. In one example, the CSB platform may be implemented as an application that runs on a virtual machine (VM) to integrate heterogeneous cloud services for different clients and different environments. The heterogeneous cloud services may include different on-demand services that can be hosted on different platforms such as Microsoft Azure™, Google Cloud™, etc. In an example embodiment, the CSB platforms may be interconnected together and each one of the interconnected CSB platforms may proxy a cloud service to the cloud service consumers. Further, a set of rules may be applied to govern a timing of performing updates on each one of these CSB platforms. An updating in the CSB platform may relate to the changing of a look-up table (LUT) information in each one of the CSB platforms. For example, a cloud service (also called a service instance) in a particular CSB platform may be used for storing data. In this example, the use of the service instance triggers a strong consistency, and the other CSB platforms may need to perform updates by storing an address of the service instance in their respective LUTs. Strong consistency may include observing one consistent state (e.g., address of the service instance) in a concurrent programming across the CSB platforms. In this manner, by using the set of rules to regulate a frequency and scope of the updates, the CSB platforms may improve cross-cloud service interoperability. Further, the interconnection between the CSB platforms may improve routing between the cloud service consumer and the CSB platforms for situations where the CSB platforms cooperate to provide cloud services to the cloud service consumers.

In one example, a plurality of CSB platforms may provide multiple cloud service instances that include instantiations of cloud service offerings from different platforms. For example, a first CSB platform may provide a first service instance that may be hosted by Microsoft Azure™, a second CSB platform may provide a second service instance that can be supported by Google Cloud™, and so on. Providing of the service instances includes allocation of cloud services to cloud service customers. The provided cloud service instances may be used by applications in a Network Operation Center (NOC) server to store data, perform backup storage, analyze telemetry data or perform data analytics, retrieve stored data, or to process the telemetry data. Since the cloud services may be hosted from different platforms, the CSB platform may implement heterogeneous cross-cloud service interoperability for the cloud service customer by being interconnected and constantly performing updates in cases of service instances that trigger strong consistency.

In one example, a use of a provisioned service instance by a NOC server application may trigger the strong consistency or a weak consistency in a particular CSB platform that provided the service instance. Strong consistency may include observing one consistent state in a concurrent programming across the CSB platforms. Given a situation where the use of the service instance in the particular CSB platform is relied upon by at least one other application in a different CSB platform, then the different CSB platform and the rest of the CSB platforms may be required to perform updates on their LUTs by storing instantaneously the address of the service instance that it is relying upon. The particular CSB platform that provided the service instance may initiate observance of the strong consistency (e.g., updating of LUT information) in the rest of the CSB platforms by sending notifications to these CSB platforms to perform the LUT updates. As described herein, the service instance that may be relied upon by the other applications can be treated as a service instance that shares access to another application in a different CSB platform. This service instance is a non-fungible service instance.

For example, the service instance that is provided by a first CSB platform is used by an application to store data in a first drive of a Redundant Array of Inexpensive Disks (RAID) 5 configuration. A RAID 5 configuration utilizes at least three drives to protect data against a single drive failure. Since the service instance may be relied upon by another application in a different CSB platform to recover, for example, lost information in one of the RAID 5 drives, then this service instance may trigger strong consistency in the first CSB platform and to the rest of other CSB platforms. This service instance is a non-fungible service instance that shares access to another application in the different CSB platform. In one example, the strong consistency is implemented by the sending of notifications by the first CSB platform to the rest of the interconnected CSB platforms to perform instantaneous LUT updates. The LUT updates may include storing the address of the service instance that shares access to other application in the different CSB platform.

The weak consistency may include the use by an application of the service instance in a particular CSB platform where a nature of the use may be similarly implemented in a different service instance in a different CSB platform. This service instance may include a fungible service instance that may not invoke instantaneous updating of the LUTs in the other CSB platforms to improve the use of power resources. The fungible service instance may facilitate a function for the application where the function can be facilitated by another service instance in a different CSB platform. Accordingly, the different CSB platform may not have to update its LUT information. For example, a $1^{st}$ service instance in a $1^{st}$ CSB platform is used to perform data analytics on telemetry data. In this example, a $2^{nd}$ service instance in a $2^{nd}$ CSB platform can similarly perform the data analytics. In this regard, the $2^{nd}$ CSB need not perform updates on its LUT information when the $1^{st}$ CSB platform performed the data analytics. The LUT may store attributes of provisioned service instances such as service instance name (or type), identification (ID), plan, and Uniform Resource Locator (URL) or sometimes called the address of the VM server in the cloud.

In some cases, a CSB platform may support multiple service instances where some of the service instances are running but not currently being used by any customer application, while some service instances may also be under maintenance or repair. In this regard, the CSB platform may prioritize tracking of the service instances that are running but not currently in use by the customer application over the service instances that are under repair or maintenance. The tracking may be performed for purposes of detecting the running service instances that may transform into non-fungible service instances when they are used, for example, to store data. In this case, the CSB platform may frequently ping (e.g., every 5 secs) the service instances that are running but not currently in use by the customer application while the pinging of the service instances that are under maintenance may be less frequent (e.g., every 6 hours) to improve the use of system resources such as power and bandwidth in the CSB platform.

As used herein, the terms "device," "portable device," "electronic device," and "portable electronic device" are used to indicate similar items and may be used interchangeably without affecting the meaning of the context in which they are used. Further, although the terms are used herein in relation to devices associated with law enforcement, it is noted that the subject matter described herein may be applied in other contexts as well, such as in a security system that utilizes multiple cameras and other devices.

The implementation and operations described above ascribed to the use of the server; however, alternative implementations may execute certain operations in conjunction with or wholly within a different element or component of the system(s). Further, the techniques described herein may be implemented in a number of contexts, and several example implementations and context are provided with reference to the following figures. The term "techniques," as used herein, may refer to system(s), method(s), computer-readable instruction(s), module(s)m algorithms, hardware logic, and/or operation(s) as permitted by the context described above and throughout the document.

Example Cloud Management Model

FIG. 1 illustrates a schematic view of an example cloud management model 100 that utilizes a plurality of cloud services brokerage (CSB) platforms to manage cloud services for different clients and different environments. In one example, the CSB platforms may be configured to act as proxies for cloud services. That is, a client may use a particular service through the proxy-CSB platform without actually knowing full details of the particular service such as VM server used, location, address, and amount of storage. Further, the CSB platforms may observe a set of rules when performing updates on its LUTs. In one example, the set of rules may be based upon a status that includes a nature of use of the provisioned service instance in a particular CSB platform. The status or nature of use may trigger an application of a strong consistency rule or a weak consistency rule. When the particular CSB platform tracks a service instance that may be relied upon by at least one other application in a different CSB platform, then the strong consistency rule may be applied. That is, each one of the other CSB platforms may perform updates by storing an address of the tracked service instance. When the service instance is not relied upon by at least one other application in the different CSB platform, then the weak consistency rule may be applied. That is, each one of the other CSB platforms may not have to perform updates. Accordingly, the use of the set of rules to regulate the timing of performing updates in the CSB platforms (e.g., hundreds) may not only improve effective use of power resources but also implements cross-cloud interoperability in the example cloud management model 100.

The example cloud management model 100 may include a plurality of NOC servers 102(1)-102(N), cameras 104(1)-104(M), CSB platforms 106(1)-106(X), and cloud services 108. Each one of the NOC servers 102(1)-102(N) and the CSB platforms 106(1)-106(X) may be located in different environments. Each one of the NOC servers 102(1)-102(N) may include a service broker API 110 and an application 112. Each one of interconnected CSB platforms 106(1)-106(X) may include standardized web services 130, a service data store 140 with a look-up table (LUT) 150, and a record updating component 160. Further, the interconnected CSB platforms 106 may be connected to a service manager 180 that facilitates communications between a NOC server 102 and a targeted CSB platform 106. The service manager 180 may further facilitate interconnection between the CSB platforms 106(1)-106(X) that can be hosted in different VM servers or cloud services. With this interconnection, one CSB platform may request another CSB platform to provide information about the service instances that it provided, the address, and the status.

The NOC server 102 is generally a communication and control system in a law enforcement agency or a facility that may be operated by a third-party to offer services to the law enforcement agency. Each one of the NOC servers 102 may be used as a base from which to monitor operations, gather and disseminate intelligence information, and control devices under the control of law enforcement officers with which it is in communication. Further, each one of the NOC servers 102 may include on-premises and off-premises clouds. The NOC servers 102 may have heterogeneous (different) off-premises clouds that can be accessed through the proxy—CSB platforms 106.

For example, a first NOC server 102(1) uses a first application 120(1) to receive telemetry data from patrol units in a particular police jurisdiction. In this example, the first application 120(1) may use a service instance (not shown) that may be provided by a 1$^{st}$ CSB platform 106(1) to store the received telemetry data in a particular off-premises VM server. In another example, a second NOC server 102(2) that includes a control center in a separate police jurisdiction receives telemetry data from the camera 104(2). To perform data analytics on the received telemetry data, the second NOC server 102(2) may use a service instance (not shown) that may be provided by the CSB platform 106 to perform the data analytics in an off-premises VM server in the cloud services 108. In these examples, the NOC servers 102 may utilize the same or different CSB platforms 106 for accessing the cloud services 108. This configuration of the CSB platforms 106 may implement the heterogeneous cross cloud-service interoperability as described herein. The NOC servers 102 may connect to these CSB platforms 106 through their corresponding service broker APIs 110.

In one example, a particular service broker API 110 may include a record of registered CSB platforms 106 that the NOC server 102 can use to connect with the cloud services 108. Further, the service broker API 110 may include the functionality of making the service instances that can be provided or supported by the CSB platform 106 to be available to the NOC server 102.

Each one of the NOC servers 102 may include a transmission tower and a base station (not shown) that enable communications with law enforcement officers (LEOs) in the field and devices from different patrol units. The NOC servers 102 may process data such as audio and/or video media contents that can be collected through a law enforcement officer's body camera 104(1), mobile patrol camera 104(2), and other sensors. The NOC servers 102 further include one or more servers (not shown) that may receive or transmit data to the LEOs and patrol units via a network (not shown). The network may be a local area network (LAN), a wide-area network (WAN), a carrier or cellular network, or a collection of networks that includes the Internet. Network communication protocols (TCP/IP, 3G, 4g, etc.) may be used to implement portions of the network.

The CSB platforms 106 may include instantiated proxy applications that run in the same or different infrastructures (e.g., Microsoft Azure™, Google Cloud™) to support virtual resource services needs of the NOC servers 102. The CSB platforms 106 may enable the integration of external/back-end services (e.g., cloud services 108) for the NOC servers 102. As proxy applications, the CSB platforms 106 may add infrastructure services such as shared storage and backup services, failover services, managed services such as back up administration and security management, software as a service, and other similar services to the NOC servers 102. For example, a first CSB platform 106(1) can be used to provide storage services for the first NOC server 102(1). In another example, a second CSB platform 106(2) may provide data analytics services for the second NOC server 102(2). In these examples, the CSB platforms 106 may act as proxy applications/software that provides varying levels of functionality, security, and privacy depending upon a configured policy. The configured policy may include, for example, a policy of a company that operates the NOC servers 102.

The service manager 180 includes hardware, software, or a combination thereof, that facilitates communications between the NOC servers 102 (through the service broker APIs 110) and the instantiated CSB platforms 106. In one example, the service manager 180 may be used as a remote management controller for the CSB platforms 106 and can include multiple functionalities. One functionality includes registering the CSB platform 106 for use by a particular NOC server 102. Another functionality includes binding a provisioned service instance with an application in the NOC server 102 before the application can use the service instance. Binding the provisioned service instance to the application triggers credentials to be delivered to the application. The credentials may include service keys that can be used by the application to interface with the service instance.

For example, the NOC server 102(1) may request creation of a service instance, and the service manager 180 sends the request to a targeted CSB platform 106(1) that can generate or provide the requested service instance. In this example, the service manager 180 may bind the created service instance to the application 120(1) so that the application 120(1) may be able to utilize the created service instance. In one example, the application 120(1) may use the created service instance without knowledge of additional details (e.g., source address) of the created service instance because the CSB platform 106(1) may be configured as a proxy for the cloud services 108. As described herein, the CSB platform provides or generates the service instance when the application has been bound to the created service instance.

In an embodiment, the service manager 180 may perform reference counting on the provisioned service instances. This can be done by counting a number of bound applications to the provisioned service instance that appear in the service data stores of the CSB platforms. In one example, a deletion of the provisioned service instance may not be implemented as long as there are references to that particular service instance. A reference count may indicate a number of applications that are bound or currently using the particular service instance. For each one of the CSB platforms 106, the service manager 180 may use the information in the service data store 140 and, particularly, the data in the LUT 150 for the reference counting.

In one example, the service manager 180 may count the number of service instances that may be running but not bound to any application, number of non-fungible service instances that may trigger strong consistencies in the CSB platforms, number of fungible service instances that may trigger strong consistencies in the CSB platforms, and number of service instances that are under maintenance or repair. In this regard, the service manager 180 may implement a set of rules to improve the effective use of power resources across the CSB platforms 106.

In one implementation, the set of rules may include an updating of records across the CSB platforms 106 when a non-fungible service instance (e.g., service instance that invokes strong consistency) in a particular CSB platform is detected. The non-fungible service instance includes the service instance that indicates the sharing of access to the same service instance. The sharing of access may include sharing of an Internet Protocol address of the service instance. In this case, other CSB platforms may be required to perform updates in their respective LUTs by storing the address, name, plan, and URL of the non-fungible service instance. For example, an application 120(1) in a first environment may use a provisioned service instance in a first CSB platform 106(1) to store backup data to a particular VM server in the cloud services 108. Since the service instance may indicate a non-fungible service, or the service instance may be relied upon by another application in a different CSB platform in case of data loss, then the rest of the CSB platforms 106(2)-106(X) may need to perform updates based on the service instance that invokes strong consistency across the CSB platforms.

In one implementation, the set of rules may delay an updating of records across the CSB platforms 106 when a fungible service instance (e.g., service instance that invokes weak consistency) in a particular CSB platform is detected. The fungible service instance includes the service instance that may not have to be relied upon by another application in a different CSB platform. In this case, other CSB platforms may not be required to perform updates in their respective LUTs by storing the address, name, plan, and URL of the fungible service instance. A delayed updating on the respective LUTs of the other CSB platforms may improve use of power resources across the CSB platforms.

The set of rules may also include prioritizing a tracking of service instances in each one of the CSB platforms 106. This rule on prioritized tracking may include polling frequently the service instances that are running but not bound to any application over the service instances that are under maintenance or repair. For example, a CSB platform 106(1) supports multiple service instances and the CSB platform 106(1) detects a portion of the supported service instances that are running but are not bound to at least one application in the NOC server 102. Further, the CSB platform 106(1) detects another portion of the provisioned service instances to be under maintenance. A service instance may be under maintenance when a developer shuts it down and restores it to a different address that may be inconsistent with its previous address in the CSB platform. In this example, the CSB platform 106(1) may prioritize the tracking of the running service instances over the created service instances that are under maintenance. The CSB platform 106(1) may track the running service instances to detect whether these service instances may subsequently transform into non-fungible service instances that may trigger the performance of updates across the CSB platforms.

For example, the running service instances that are not bound to at least one application is pinged at a higher frequency (e.g., every five seconds) while the service instances that are under maintenance are pinged at a lower frequency (e.g., every hour). In this example, the CSB platforms may not perform updates in their respective records with regard to the running service instances until these service instances are transformed into non-fungible service instances. Accordingly, this technique improves the use of power resources in the cloud management model 100.

The standardized web services 130 may be configured to keep track of the services in the other CSB platforms and facilitate a function of delegating the services that can be used by the NOC applications.

The service data store 140 may include the details of the number of service instances that are running but not bound to any application, number of non-fungible service instances, number of fungible service instances, and the number of service instances that are under maintenance or repair. In one example, the service data store 140 may provide the information for the reference counting that is performed in the service manager 180. The service data store 140 may include the LUT 150 that stores the service instance identifications (IDs), names or types of the service instances, address, and status of the service instances. The generation of the service instances and the populating of the LUT 150 are further described in FIG. 2 below.

The record updating component 160 may keep track of the status of the service instances in the service data store 140 to determine the generated service instances that may trigger strong or weak consistencies in the CSB platforms. In one example, the record updating component 160 facilitates the updating of records across the CSB platform 106 based upon a detected service instance that may trigger strong consistency in the CSB platforms. That is, the record updating component 160 sends instructions to the other CSB platforms 106 to perform updates based upon the detected service instance that may trigger the strong consistency in the CSB platforms. The record updating component 160 may send the instructions directly to the other CSB platforms 106 or through the service manager 180. For the services instances that may trigger weak consistencies, the record updating component 160 may not have to initiate spontaneous updating of LUTs across the other CSB platforms.

The cloud services 108 may include cloud services that can be accessed via different cloud service providers. In one example, the cloud service providers may provide services via one or more outside networks with respect to the CSB platform 106. The cloud services 108 can be broadly divided into four categories: Infrastructure-as-a-Service (IaaS), Platform-as-a-Service (PaaS), Software-as-a-Service (SaaS), and Managed Services. IaaS refers to a virtualized computing infrastructure through which cloud services are provided (e.g., virtual server space, network connections, bandwidth, IP addresses, load balancers, etc.). PaaS in the cloud refers to a set of software and product development tools hosted on the cloud for enabling developers (i.e., a type of cloud service consumer) to build applications and services using the cloud. SaaS refers to applications that are hosted on and available on-demand by the cloud service consumers via the cloud. Managed Services refers to services such as backup administration, remote system administration, application management, etc. that are enabled by managed service providers for any cloud services. In one example, the cloud service may be sold to services consumers on an on-demand basis, e.g., by the minute or hour.

In a particular embodiment, multiple service instances (e.g., thousands) may be supported in each one of the CSB platforms 106. In this embodiment, each one of the record updating components 160 in the CSB platforms 106 may be configured to follow the set of rules for the performing of LUT updates in the CSB platforms 106 to improve the effective use of power resources. For example, a record updating component 160(1) may initiate updating by the rest of the CSB platforms when a non-fungible service instance is utilized in the first CSB platform 106(1). In another example, the record updating component 160(1) may prioritize polling of the detected running service instances that are not bound to any application over the services instances that are under maintenance or repair. In these examples, the operation of the record updating component 160(1) may facilitate cloud-service interoperability and improve the effective use of power resources in the cloud management model 100.

Example Service Instance Provisioning and Populating a CSB Platform LUT

Figure 2:
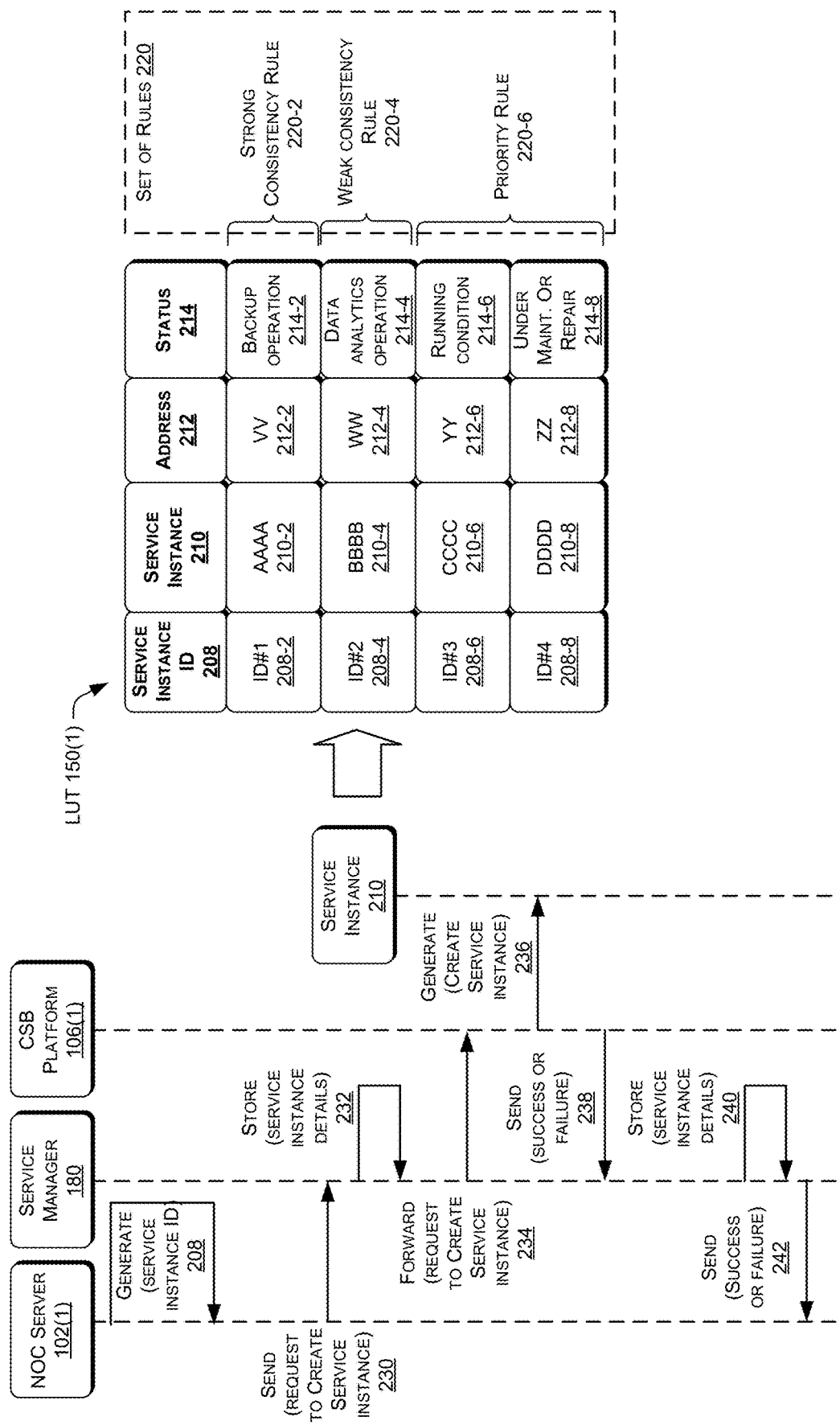
FIG. 2 is a block diagram showing an example implementation of populating a particular CSB platform look-up table (LUT) with provisioned service instances and tracking the provisioned service instances for strong or weak consistencies.

FIG. 2 is a block diagram 200 showing an example implementation of generating service instances and populating a particular CSB platform LUT with generated service instances. Depending upon a tracked status of the service instances in the LUT, the particular CSB platform may implement the set of rules as described herein. For example, the first CSB platform 106(1) may initiate an updating of records in the other CSB platforms 106(2)-106(X) in case of a detected service instance that invokes strong consistency, prioritize tracking of the running service instances that are not in use by an application over the service instances that are under repair or maintenance, and/or perform other functions that relate to an implementation of the set of rules in the service manager 180. In the following discussion of FIG. 2, continuing reference is made to the elements and reference numerals shown in and described with respect to the first CSB platform 106(1) and NOC server 102(1) of FIG. 1.

The block diagram 200 shows the first NOC server 102(1), service manager 180, first CSB platform 106(1), a created or generated service instance 210, LUT 150(1) of the first CSB platform 106(1), and a set of rules 220 that are applied based upon a tracked status of the provisioned service instance. The LUT 150(1) further includes a service instance ID 208, (a type of) service instance 210, address 212, and a status 214. The block diagram 200 illustrates a process of creating and provisioning the service instance in the first CSB platform 106(1), storing the provisioned service instance in the LUT 150(1), and applying the set of rules 220 to improve the effective use of power resources and bandwidth in the first CSB platform 106(1). The described process for the first CSB platform 106(1) may similarly be applied to another CSB platform such as the second CSB platform 106(2), or to any other combination of the CSB platforms 106 without affecting the embodiments described herein.

In one example, an application 120(1) in the NOC server 102(1) may request a particular service instance to be provisioned and in this regard, the first NOC server 102(1) may generate 208 a service instance identification (ID) 208 for the requested particular service instance. The first NOC server 102(1) sends 230 a request to create a service instance to the service manager 180 and in response to the received request, the service manager 180 stores 232 service instance details of the requested service instance. The service instance details, for example, may include the service instance ID 208, name or type of the requested service instance, plan, and URL.

The service manager 180 may then forward 234 the request to create the service instance to a targeted CSB platform 106(1) and in response to the received request, the CSB platform 106(1) generates 236 the service instance 210. The generated service instance 210 may include an instantiation of the cloud service offering in the cloud services 108. With the generated service instance 210, the CSB platform 106(1) sends 238 a (success or failure) status of the generation of the service instance 210. The service manager 180 may also store 240 the details of the status and then send 242 the (success or failure) status notification to the NOC server 102(1). In one example, the CSB platform 106(1) may bind the application 120(1) to the created service instance 210 so that the application 120(1) may use the provisioned service instance 210. Depending upon the use of the provisioned service instance 210, the service instance 210 may trigger strong or weak consistencies in the CSB platforms. Further, the CSB platform 106(1) may act as a proxy for the provisioned service instance 210. For example, the application 120(1) may utilize the provisioned service instance 210, but the application 120(1) may not have additional knowledge on the details of the service instance 210 such as the address of the VM server and/or logical addresses used to store data.

Over time, a plurality of provisioned service instances 210 and corresponding service IDs 208 and addresses 212 are stored in the LUT 150-1. For example, a generated first service instance—"AAAA" 210-2 includes an "ID #1" 208-2 as the service ID 208, "VV" 212-2 as the address 212, and "backup operation" 214-2 as a tracked status 214 (e.g., tracked status 214 may indicate the type of service instance). In another example, a generated second service instance—"BBBB" 210-4 includes an "ID #2" 208-4 as the service ID 208, "WW" 212-4 as the address 212, and "running operation" 214-2 as a tracked status 214, and so on. In these examples, the set of rules 220 to be implemented may be based upon the tracked status 214 that may include the nature or type of the generated service instance 210.

For example, the generated first service instance—"AAAA" 210-2 is detected to include "backup operation" 214-2 as the status 214. The "backup operation" 214-2 status may indicate the first service instance—"AAAA" 210-2 to be a non-fungible service instance. That is, another application from another CSB platform may rely on the address of the first service instance—"AAAA" 210-2 to access the stored data. In this case, the first service instance—"AAAA" 210-2 may indicate sharing of access to the same first service instance—"AAAA" 210-2 for another application in a different CSB platform. In response to this detected type of use, a strong consistency rule 220-2 may be applied to a service instance. For example, in RAID 5 configuration, where a first drive may be used to backup data in a second drive, the storing of data in the first drive by the first service instance—"AAAA" 210-2 may be relied upon by another application when accessing the stored backup data to recover lost information in the second drive. In this example, the first service instance—"AAAA" 210-2 may share its address to the other application that accesses the stored backup data to recover the lost information in the second drive.

In another example, the second service instance—"BBBB" 210-4 may be detected to include "data analytics operation" 214-4 as the status 214. The "data analytics operation" 214-4 status may indicate the second service instance—"BBBB" 210-4 to be a fungible service instance. That is, another application from another CSB platform may not rely on the second service instance—"BBBB" 210-4 to perform the data analytics operation on a received telemetry data. In this case, the use of the second service instance—"BBBB" 210-4 may trigger a weak consistency in the CSB platforms and as such, a weak consistency rule 220-4 may be applied. The weak consistency rule 220-4 may include a delay in the performing of updates across the CSB platforms where the delay can benefit the rest of the CSB platforms from performing spontaneous updates in their respective LUTs.

In another example, the third service instance—"CCCC" 210-6 may be detected to be in "running condition" 214-6 but is not used by any application in the CSB platforms. Further, the fourth service instance—"DDDD" 210-8 may be detected to be "under maintenance/repair" 214-8. In this case, a priority rule 220-6 may be implemented on the third service instance—"CCCC" 210-6 and the fourth service instance—"DDDD" 210-8. The priority rule 220-6 may include polling one service instance more frequently than another service instance. For example, the priority rule 220-6 may include minimal pinging (e.g., once every at least one hour or six hours) of the fourth service instance—"DDDD" 210-8 over the third service instance—"CCCC" 210-6. Stated differently, the third service instance—"CCCC" 210-6 may be checked frequently for possible transformation into a non-fungible service instance while the fourth service instance—"DDDD" 210-8 is checked less frequently because of its incapability to be used by any application.

Example CSB Platform

Figure 3:
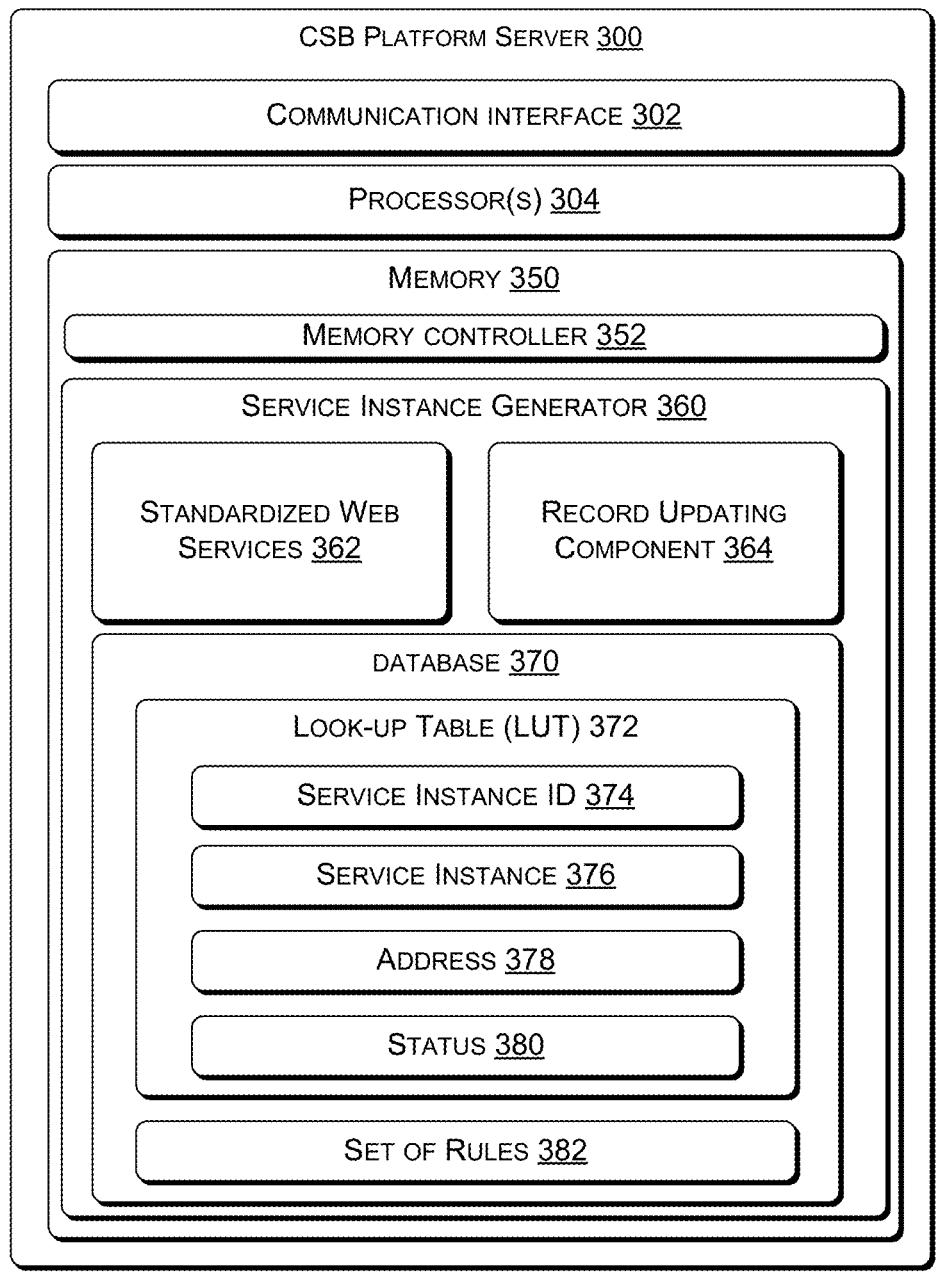
FIG. 3 is a diagram of an example CSB platform server in accordance with the technologies described herein.

FIG. 3 is a diagram of an example CSB platform server 300 in accordance with the technologies described herein.

The CSB platform server 300 may include hardware, software, or a combination thereof, that acts as a proxy or instantiates proxy applications for the cloud services. In one example, the instantiated proxy applications are similar to the CSB platforms 106 of FIG. 1. Further, the instantiated proxy applications may be hosted or can run in different infrastructures (e.g., Microsoft Azure™, Google Cloud™) and implement a set of rules to improve the use of power resources for cross-cloud service interoperability.

In one example, the CSB platform server 300 includes a communications interface 302 that facilitates communication with the NOC servers 102 and the service manager such as the service manager 180 of FIG. 1. In one example, the service manager 180 may be a part of the CSB platform server 300, or the service manager 180 may be used as a remote management controller for all CSB platform servers 300. The communications interface 302 may further provide networking capabilities for the CSB platform server 300. For example, the CSB platform server 300, by way of the communications interface 302, may exchange data with other CSB platforms, NOC servers, computers, servers, etc. via one or more networks (not shown). Communication between the CSB platform server 300 and other electronic devices may utilize any sort of communication protocol known in the art for sending and receiving data and/or voice communications.

The CSB platform server 300 includes a processor 304 having electronic circuitry that executes instruction code segments by performing basic arithmetic, logical, control, memory, and input/output (I/O) operations specified by the instruction code. The processor 304 can be a product that is commercially available through companies such as Intel® or AMD®, or it can be one that is customized to work with and control a particular system. The processor 304 may be coupled to other hardware components used to carry out device operations. The other hardware components may include one or more user interface hardware components not shown individually—such as a keyboard, a mouse, a display, a microphone, a camera, and/or the like—that support user interaction with the CSB platform server 300.

The CSB platform server 300 also includes memory 350 that stores data, executable instructions, modules, components, data structures, etc. The memory 350 may be implemented using computer-readable media. Computer-readable media includes, at least, two types of computer-readable media, namely computer-readable storage media and communications media. Computer-readable storage media includes, but is not limited to, Random Access Memory (RAM), Dynamic Random Access Memory (DRAM), Read-Only Memory (ROM), Electrically Erasable Programmable Read-Only Memory (EEPROM), flash memory or other memory technology, Compact Disc—Read-Only Memory (CD-ROM), digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. As defined herein, computer-readable storage media do not consist of and are not formed exclusively by, modulated data signals, such as a carrier wave. In contrast, communication media may embody computer-readable instructions, data structures, program modules, or other data in a modulated data signal, such as a carrier wave, or other transmission mechanisms.

A memory controller 352 is stored in memory 350 of the CSB platform server 300. The memory controller 352 may include hardware, software, or a combination thereof, that enables the memory 350 to interact with the communication interface 302, processor 304, and other components of the CSB platform server 300. For example, the memory controller 352 receives a request to provision a service instance from the communication interface 302 and sends the request to a service instance generator 360 for further processing. In another example, the memory controller 352 may retrieve data from memory 350 where the data will be processed in the processor 304.

The memory 350 stores the service instance generator 360 that, when executed, generate and provision the requested service instance as described herein. As shown, the service instance generator 360 includes standardized web services 362, a record updating component 364, and a database 370 with a LUT 372. The LUT 372 may further include a service instance ID 374, a provisioned service instance module 376, address 378, and a status 380. A set of rules 382 in the database 370 may be applied based upon a tracked status 380. Although shown as part of the service instance generator 360, the standardized web services 362, record updating component 364, and the LUT 372 may be stored in other memory (not shown), in another content sharing services server, or in remote locations. Further, each component of the service instance generator 360 can be realized in hardware, software, or a combination thereof. For example, the record updating component 364 is a software module designed to implement the set of rules 382 as described herein.

The standardized web services 362 and the record updating component 364 are similar to the standardized web services 130 and record updating component of FIG. 1. In one example, the record updating component 364 may be configured to track the status 380 of each one of the provisioned service instances in the service instance module 376. Given a situation where all service instances 376 are fungible i.e., one service instance can be a replacement to another, then the status 380 may trigger a weak consistency in the CSB platforms. In this regard, the record updating component 364 may implement a weak consistency rule as described in FIG. 3. However, when a particular service instance 376 stops being fungible, then the record updating component 364 may send instructions for the other CSB platforms to update their corresponding service data store based upon the detected service instance that may trigger strong consistency in the CSB platforms.

The database 370 may store the data that may be needed to improve the use of resources in the CSB platforms as described herein. The LUT 372 may include the service instance ID 374, service instance 376, address 378, and the status 380 that is similar to the service instance ID 208, service instance 210, address 212, and the status 214, respectively, of FIG. 2.

The set of rules 382 is similar to the set of rules 220 of FIG. 2. The set of rules 382 may include references for determining whether a service instance triggers a strong consistency or weak consistency in the CSB platform. In one example, a strong consistency rule may be triggered by a service instance that is non-fungible. In this case, there is a need for the other CSB platforms to update their respective records to include the address of the non-fungible service instance. In another example, a weak consistency rule may be triggered by a service instance that is fungible. In this case, the other CSB platforms may delay updating in their respective records that include the storing of the address of the fungible service instance.

Further functionalities of the CSB platform server 300 and its component features are described in greater detail, below.

Figure 4:
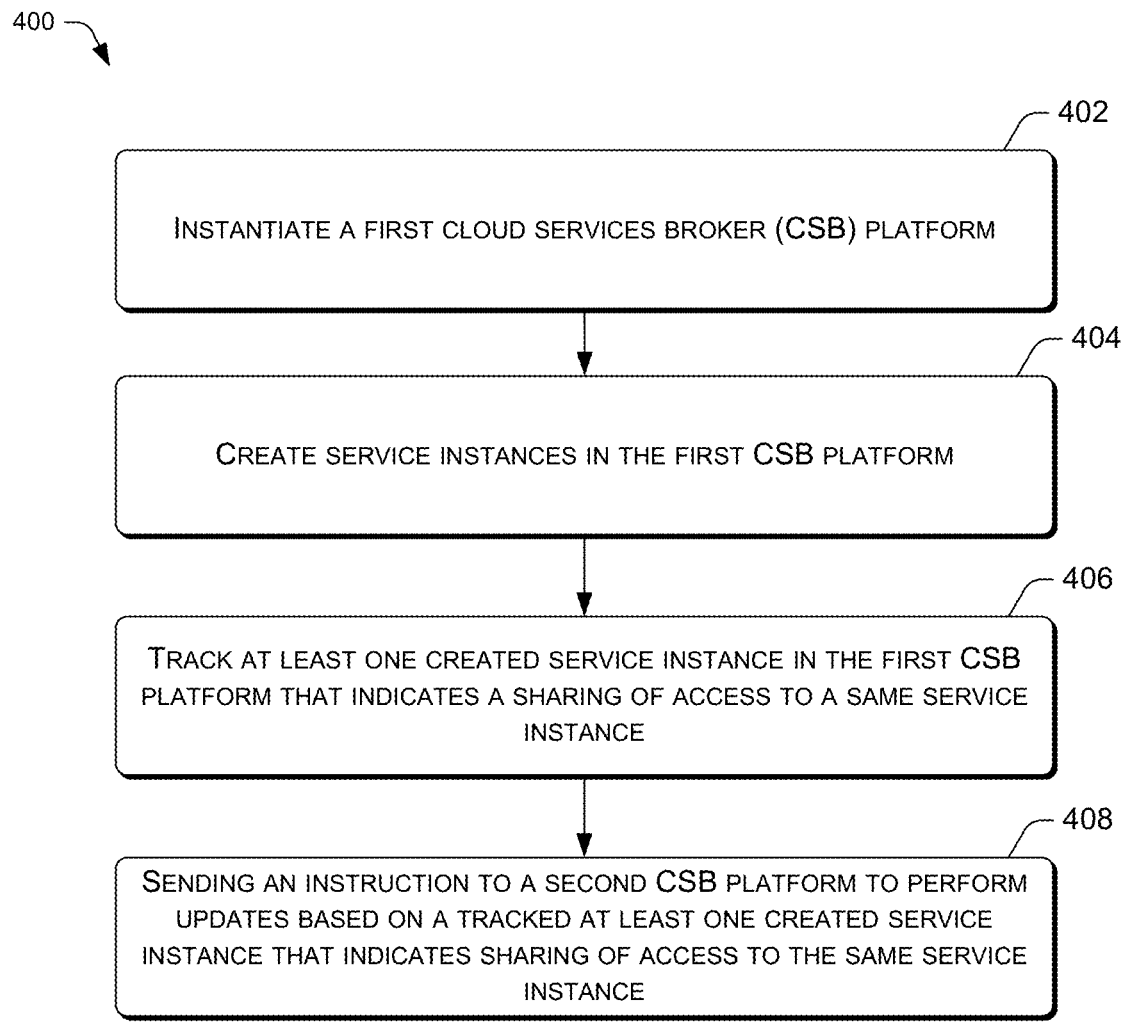
FIG. 4 is a flow diagram of an example methodological implementation for establishing CSB platforms to manage cloud services for different clients and different environments.

Example Implementation—Establishing Proxy CSB Platforms and Sending of Updates FIG. 4 is a flow diagram 400 that depicts a methodological implementation of at least one aspect of the techniques for establishing CSB platforms (or CSB applications) to manage cloud services for different clients and different environments. The CSB platforms may be interconnected and configured to act as a proxy for the cloud services. As described herein, the CSB platform is interchangeably referred to as a CSB application that can run in a cloud infrastructure. In the following discussion of FIG. 4, continuing reference is made to the elements and reference numerals shown in and described with respect to the CSB platform server 300 of FIG. 3. Further, certain operations may be ascribed to particular system elements shown in previous figures. However, alternative implementations may execute certain operations in conjunction with or wholly within a different element or component of the system(s). Furthermore, to the extent that certain operations are described in a particular order, it is noted that some operations may be implemented in a different order to produce similar results.

At block 402, a CSB platform server processor instantiates a first CSB platform. For example, the CSB platform server processor 304 may instantiate a first CSB platform 106(1) that runs on a VM in an arbitrary cloud. In this example, the first CSB platform 106(1) may be implemented as a proxy application for one or more cloud services 108. In one example, an application may use a particular service instance through the proxy CSB platform without actually knowing, for example, the address of the VM server that is used by the CSB platform.

At block 404, the CSB platform server processor 304 in communication with a service instance generator 360 facilitates the generation of the service instances. For example, the CSB platform server receives a request to create a service instance from the NOC server. In response to the received request to create a service instance, processor 304 in communication with the service instance generator 360 generates the requested service instance. As described herein, the generation of the service instance can also be called sometimes as creation or provisioning of the service instance.

At block 406, a record updating component tracks at least one created service instance in the CSB platform server that indicates a sharing of access to a same service instance. For example, the record updating component 364 may use the information in the status 380 to track the status of each service instance in the service instance module 376. Given a situation where the use of the service instance triggers strong consistency as described herein, then the CSB platform server may share the address of the service instance to another application that may rely on this address to perform a function (e.g., restoring lost information).

At block 408, the record updating component 364 in communication with the CSB platform server processor 304 may send an instruction to a second CSB platform to perform updates based on a tracked at least one created service instance that indicates sharing of access to the same service instance. For example, the record updating component 364 detects a service instance that triggers the strong consistency in the CSB platform servers. In this example, the record updating component 364 may initiate the sending of instructions to the rest of the CSB platform servers to perform updating of their respective LUTs. The LUT updating may include storing the service ID 208, (type of) service instance 210, and the address 212 of the non-fungible service instance 210.

Figure 5:
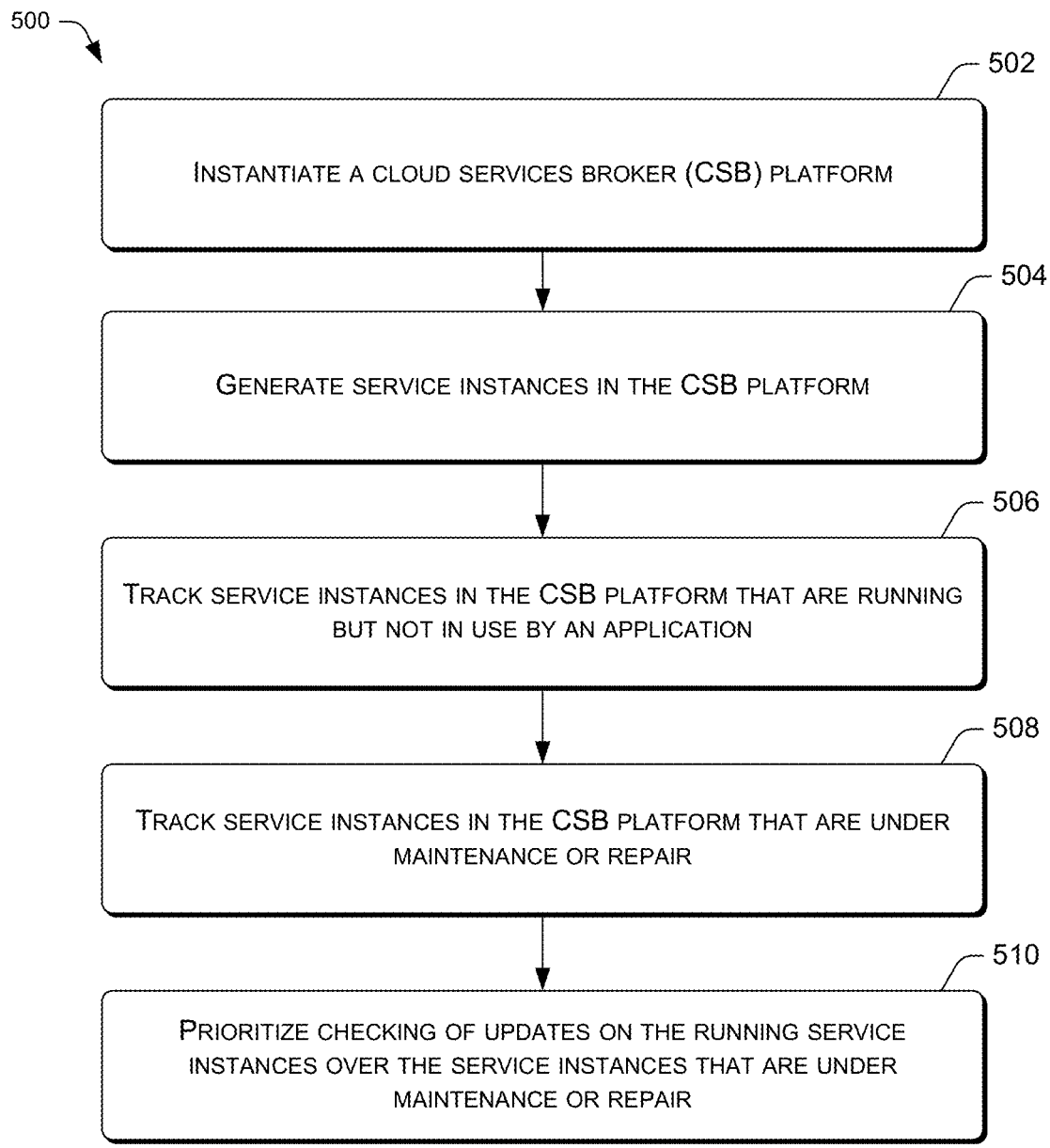
FIG. 5 is a flow diagram of another example methodological implementation for establishing CSB platforms to manage cloud services for different clients and different environments.

Example Implementation—Establishing Proxy CSB Platforms and Tracking Priority FIG. 5 is a flow diagram 500 that depicts a methodological implementation of at least one aspect of the techniques for improving the effective use of power resources in the CSB platforms. As described herein, the CSB platform is interchangeably referred to as a CSB application that can run in a cloud infrastructure. In the following discussion of FIG. 5, continuing reference is made to the elements and reference numerals shown in and described with respect to the CSB platform server 300 of FIG. 3. Further, certain operations may be ascribed to particular system elements shown in previous figures. However, alternative implementations may execute certain operations in conjunction with or wholly within a different element or component of the system(s). Furthermore, to the extent that certain operations are described in a particular order, it is noted that some operations may be implemented in a different order to produce similar results.

At block 502, a CSB platform server processor instantiates a CSB platform. For example, the CSB platform server processor 304 may instantiate a first CSB platform 106(1). In this example, the first CSB platform 106(1) may be implemented as a proxy application for one or more cloud services.

At block 504, the CSB platform server processor 304 in communication with a service instance generator facilitates the generation of the service instances in the instantiated CSB platform. For example, the CSB platform server receives a request to create a service instance from the NOC server. In response to the received request to create a service instance, processor 304 in communication with the service instance generator 360 generates the requested service instance.

At block 506, a record updating component tracks a plurality of service instances in the CSB platform server that may be currently running but not in use by an application. For example, a provisioned service instance may not be bound to any application. In this example, the provisioned service instance may be considered as running but not in use by an application.

At block 508, the record updating component tracks a plurality of service instances in the CSB platform server that are currently under maintenance or repair.

At block 510, the record updating component 364 in communication with the CSB platform server processor 304 may prioritize a checking of updates on the running service instances that are not in use by an application over the service instances that are under maintenance—service instances. For example, the record updating component 364 detects a set of service instances that are currently running but not in use by an application while another set of service instances are detected to be under repair or maintenance. In this example, the CSB platform server processor 304 may prioritize a checking of updates on the running service instances over the under maintenance—service instances. That is, the CSB platform server processor 304 may ping the running service instances (not in use by an application) at a higher frequency (e.g., every 5 seconds) than the under maintenance—service instances (e.g., pinged every one hour, two hours, etc.)

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more computer-readable storage media storing computer-executable instructions that upon execution cause one or more processors to perform acts comprising:
   instantiating a first cloud services broker (CSB) platform;
   creating service instances in the first CSB platform;
   tracking at least one created service instance in the first CSB platform that indicates a sharing of access to a same service instance by another service instance in a second CSB platform to perform a function;
   tracking the service instances in the first CSB platform that are under maintenance and running service instances that are not in use by an application;
   prioritizing a checking of update on the running service instances over the under maintenance—service instances; and
   sending an instruction to the second CSB platform to perform updates based on a tracked at least one created service instance that is accessed by the other service instance in the second CSB platform to perform the function.

2. The one or more computer-readable storage media of claim 1, wherein the first and second CSB platforms include instantiated proxy applications that run in different infrastructures.

3. The one or more computer-readable storage media of claim 1, wherein the first and second CSB platforms are interconnected.

4. The one or more computer-readable storage media of claim 3, wherein the interconnected CSB platforms act as proxies to cloud services.

5. The one or more computer-readable storage media of claim 1, wherein the sending the instruction to perform updates in the second CSB platform includes storing an address of the tracked at least one service instance in the first CSB platform.

6. The one or more computer-readable storage media of claim 1, wherein the tracked at least one created service instance that indicates the sharing of access to the same service instance triggers a strong consistency.

7. The one or more computer-readable storage media of claim 1, wherein the function includes a backup operation.

8. The one or more computer-readable storage media of claim 1, wherein the service instances that are under maintenance include the service instances that are restored to an address that is inconsistent with a previous address in the first CSB platform.

9. The one or more computer-readable storage media of claim 1, wherein the prioritizing includes the checking of update for the running service instances at a higher frequency than the under maintenance—service instances.

10. A device, comprising:
    a communication interface; and
    a processor coupled to the communication interface, the processor is configured to:
    instantiate a first cloud services broker (CSB) platform;
    create service instances in the first CSB platform;
    track at least one created service instance in the first CSB platform that indicates a sharing of access to a same service instance by another service instance in a second CSB platform to perform a function;
    track the service instances in the first CSB platform that are under maintenance and running service instances that are not in use by an application;
    prioritize a checking of update on the running service instances over the under maintenance—service instances; and
    send an instruction to the second CSB platform to perform updates based on a tracked at least one created service instance that is accessed by the other service instance in the second CSB platform to perform the function.

11. The device of claim 10, wherein the first and second CSB platforms are interconnected.

12. The device of claim 11, wherein the interconnected CSB platforms act as proxies to cloud services.

13. The device of claim 10, wherein the updates in the second CSB platform includes storing an address of the tracked at least one service instance in the first CSB platform.

14. The device of claim 10, wherein the tracked at least one created service instance that indicates the sharing of access to the same service instance triggers a strong consistency.

15. The device of claim 10, wherein the function includes a backup operation.

16. The device of claim 10, wherein the service instances that are under maintenance include the service instances that are restored to an address that is inconsistent with a previous address in the first CSB platform.

17. The device of claim 10, wherein the checking of update for the running service instances at a higher frequency than the under maintenance—service instances.

18. A computer-implemented method, comprising:
    instantiating a first cloud services broker (CSB) platform;
    creating different service instances in the first CSB platform;
    tracking at least one created service instance in the first CSB platform that indicates a sharing of access to a same service instance by another service instance in a second CSB platform to perform a function;
    tracking the service instances in the first CSB platform that are under maintenance and running service instances that are not in use by an application;
    prioritizing a checking of update on the running service instances over the under maintenance—service instances, wherein the prioritizing includes the checking of update for the running service instances at a higher frequency than the under maintenance—service instances; and
    sending an instruction to the second CSB platform to perform updates based on a tracked at least one created service instance that is accessed by the other service instance in the second CSB platform to perform the function.

19. The computer-implemented method of claim 18, wherein the performing updates in the second CSB platform includes storing an address of the tracked at least one service instance.

20. The computer-implemented method of claim 18, wherein the tracked at least one created service instance that indicates the sharing of access to the same service instance triggers a strong consistency.

* * * * *